United States Patent
Weihrauch

(10) Patent No.: US 6,810,551 B1
(45) Date of Patent: Nov. 2, 2004

(54) BRUSH, ESPECIALLY TOOTHBRUSH

(75) Inventor: Georg Weihrauch, Wald-Michelbach (DE)

(73) Assignee: Coronet-Werke GmbH, Wald-Michelbach (DE)

( * ) Notice: Subject to any disclaimer, the term of this patent is extended or adjusted under 35 U.S.C. 154(b) by 360 days.

(21) Appl. No.: 10/031,701

(22) PCT Filed: Jul. 26, 2000

(86) PCT No.: PCT/EP00/07159

§ 371 (c)(1),
(2), (4) Date: Jan. 23, 2002

(87) PCT Pub. No.: WO01/10267

PCT Pub. Date: Feb. 15, 2001

(30) Foreign Application Priority Data

Aug. 7, 1999 (DE) .......................................... 199 37 481

(51) Int. Cl.[7] .............................. A46B 9/04; A46B 9/10
(52) U.S. Cl. ....................................... 15/167.1; 15/172
(58) Field of Search .............................. 15/167.1, 172, 15/187, 188, 191.1

(56) References Cited

U.S. PATENT DOCUMENTS

| 1,770,195 A | | 7/1930 | Burlew | |
|---|---|---|---|---|
| 5,325,560 A | | 7/1994 | Pavone et al. | |
| 5,373,602 A | | 12/1994 | Bang | |
| 5,758,383 A | * | 6/1998 | Hohlbein | 15/167.1 |
| 5,991,958 A | * | 11/1999 | Hohlbein | 15/167.1 |

FOREIGN PATENT DOCUMENTS

| DE | 36 28 722 | 2/1988 |
|---|---|---|
| DE | 37 43 140 | 6/1989 |
| DE | 197 38 256 | 3/1999 |
| EP | 03 10 482 | 4/1989 |
| WO | WO 97 20 484 | 6/1997 |
| WO | WO 98 27 846 | 7/1998 |

* cited by examiner

Primary Examiner—Randall Chin
(74) Attorney, Agent, or Firm—Paul Vincent

(57) ABSTRACT

A brush comprises a bristle carrier of at least two substantially parallel layers of different plastics produced in a two-component injection molding process and bristles fastened to at least one of the layers. The brush is characterized in that at least the bristle carrier layer remote from the bristles has openings, which are circumferentially closed and filled with the plastic of the other layer.

16 Claims, 2 Drawing Sheets

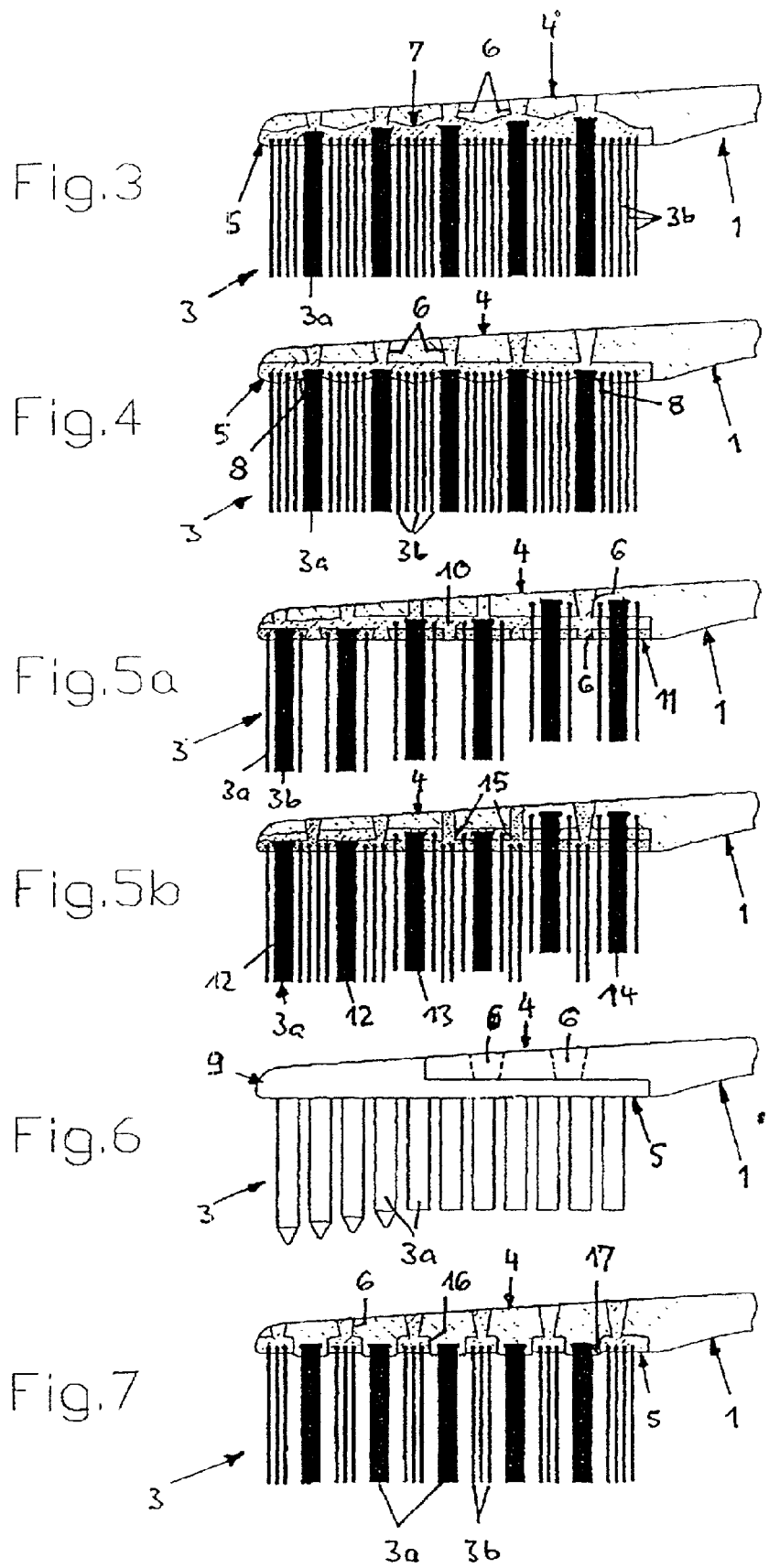

BRUSH, ESPECIALLY TOOTHBRUSH

BACKGROUND OF THE INVENTION

The invention relates to a brush having a bristle carrier comprising at least two substantially parallel layers of different plastics, produced using the two-component injection molding process, and with bristles fixed to at least one of the layers.

Brushes produced in a two-component injection molding process are known in numerous different constructional forms. There are several reasons for constructing the bristle carrier from two different plastics. Thus, it can be advantageous for cost reasons alone to make a larger part of the bristle carrier from an inexpensive plastic, with the remainder being made from a higher grade, more expensive plastic, in order to obtain a cost saving. The higher grade plastic mainly fulfils strength functions, but can also fulfil special use functions. In addition, the plastic carrying the bristles can be chosen as a function of the bristle fastening mode. Fastening can take place in pre-shaped holes by punching, by injection molding of the fastening side ends in the plastic of the bristle carrier, by welding onto the bristle carrier or using other thermoplastic or mechanical processes.

From the manufacturing and also use standpoints special demands are made in the case of small brushes, particularly toothbrushes. A large number of bristles must be housed in a comparatively small surface area in order to bring about the cleaning action on the teeth and optionally a massaging action of the gums combined therewith. In addition, the large number of bristles must be housed on a bristle carrier with a small volume, because the bristle carrier must take account of the very different space conditions in the mouth of the maximum number of users. This makes necessary a narrow, flat brush head. The bristles must also have a high extraction resistance, which should be as constant as possible for all the bristles, because detached bristles not only lead to unpleasant effects in the mouth through jamming in the interdental gaps, but can also constitute a health hazard if they enter the esophagus or digestive tract.

A toothbrush head is made from two components (DE 3628722 A1) e.g. in order to wholly or partly envelop the brush head part having the necessary strength characteristics, which is made from a rigid plastic, with a softer, rubber-like material, e.g. an elastomer in order to reduce the injury risk in the mouth as a result of sharp edges and the like. In particular a layer-wise structure is known, in which the rigid plastic of the brush head is covered on its narrow sides and underside with the elastomer and the bristles are exclusively connected by welding to the elastomer layer. Through the fastening of the bristles in the elastomer layer the bristles also acquire a type of elastic mounting, which aids the sideways, elastic deflection of the bristles.

In another known construction (U.S. Pat. No. 1,770,195) the brush head of a hard material is integral with the handle and is completely surrounded by a rubber-like material provided on the bristle side with cup-shaped studs in which the bristle bundles are inserted, so as to acquire in this case again an additional springiness transversely to the bundle axis.

It is also known (U.S. Pat. No. 5,373,602) to construct the brush head in two parts, one part integral with the handle material and having a shorter construction, with the front end of the head being supplemented by a second elastomer part, which also engages over the top of the hard part and covers the latter. This is in particular intended to permit a bending of the front head part with respect to the rigid, short head part. If the handle and rear head part are made from conventional rigid plastics such as PS, PP, etc., these two different plastics cannot be adequately firmly interconnected, or this can only be achieved with considerable effort and expenditure. Conventional two-component injection molding processes are excluded, because the two plastics form no integral connection.

In another known construction (EP 310482) the brush head made from rigid plastic and in one piece with the handle is surrounded on the narrow sides and brush head end by an elastomer, whereas the bristles are exclusively fixed to the surface of the rigid part left free. This naturally leads to a deterioration of the area usable for the bristle configuration. The adhesion of the elastomer part compared with the aforementioned construction is improved in that said part engages in cap-like manner at the front end over the brush head and is fixed by a supplementary heat treatment on which EP 314482 provides no information.

It is finally known (WO 97/20484) to give a narrower construction to the hard part of the brush head in one piece with the handle in the longitudinal axis of the head and to increase the size in the vicinity of the front end to the contour dimension of the head. The narrow part forms the carrier for a type of skeleton structure with cup-shaped receptacles for the bristle bundles, said receptacles being made from the same rigid plastic. These cup-shaped receptacles are injected round with an elastomer, whilst completing the contour of the head and said elastomer may optionally surround the entire hard or rigid part. The bristles are partly fixed in the hard central part and partly in the cup-shaped receptacles of the elastomeric marginal parts. The latter are consequently able to give way in a flexible manner. In the latter construction as a result of the multiple penetration of the hard and soft components a secure connection between the two plastics can be assumed, but the structure of the brush head is extremely complicated and complicated injection moulds are required and the brush head flexibility desired in the case of toothbrushes is only obtained in the marginal areas and cannot be adapted to specific needs.

The problem of the invention, in the case of a brush, whose bristle carrier is made from different plastics, is to propose a construction which on the one hand permits an individual adaptation of flexibility to the particular requirements and on the other ensures a reliable and permanent connection between the two plastic components.

To solve this problem the invention is based on a brush having a bristle carrier comprising at least two substantially planar, parallel layers of different plastics produced in a two-component injection molding process, the bristles being fastened to at least one of the layers (DE 3628722). In a further development of this brush the problem of the invention is solved in that at least the bristle carrier layer remote from the bristles has openings, which are circumferentially closed and filled with the plastic of the other layer.

SUMMARY OF THE INVENTION

The invention firstly makes use of the clearly defined and relatively simple construction of the bristle carrier from substantially parallel layers offering for the at least two plastics large contact surfaces and correspondingly large adhesion surfaces as a consequence. In such a layer structure the use characteristics of the brush can be very precisely matched to the particular requirements without the need for complicated injection moulds for production purposes. It is in particular possible to very precisely adapt the flexibility over the entire length of the brush head or partial areas thereof to the given needs, by the selection of the plastics used, by a corresponding geometry of the layers and in particular the layer thickness with respect to the moment of inertia decisive for bendability. The circumferentially closed openings, which are provided at least in the layer remote from the bristle side are filled with the plastic of the other layer in two-component injection molding. This leads to an increase in the size of the adhesion surface and at the same time a type of tenon joint between the two layers, so as to permit an adequately firm and reliable interconnection of plastics, which are otherwise difficult to join together. In addition, the circumferentially closed openings, which lead to a weakening of the layer in which they are located, can be used for adjusting to the particular requirements the flexibility of the bristle carrier through the shape, arrangement and number of the openings.

Between the edge of the openings of one layer and the plastic of the other layer filling the same there can be a non-positive connection, which is particularly effective when the plastic of one layer, which penetrates the openings, expands during injection molding.

The non-positive connection can be supplemented or replaced by an integral connection, provided that the plastics of the at least two layers have sufficient affinity.

Both the aforementioned connection types can be supplemented or replaced by a positive connection, in that the openings have undercuts.

In the case of brushes with a flexible bristle carrier, which gives way under the forces acting on the bristles when the brush is being used, according to the invention the flexibility can be adjusted by the thickness of the layers and the choice of the plastics forming them.

Instead of or in addition thereto the flexibility of the bristle carrier can be adjusted through the number and/or the shape or size of the circumferentially closed openings in one layer.

It is particularly advantageous to have slot-like openings running transversely to the longitudinal axis of the bristle carrier and which are marginally closed. With such a construction there is mainly a non-positive and optionally also a positive connection of the two plastics in the vicinity of the opening.

Instead of this the openings in one layer can also have a wall diverging from the interface between the two layers so as to form an undercut, which leads to a positive connection. During injection molding the plastic of one layer filling the openings can, as desired, be injected on from one or other side.

The invention also provides the possibility of giving the openings in the layer remote from the bristles and forming the back of the bristle carrier a contour which, in conjunction with the differently colored plastics for the two layers, forms an information medium for the user. For example, it can be a color indicator for the type of bristles, e.g. their hardness, letters with information for the user, information in the form of ordering means or the like.

According to a preferred development, at least the layer carrying the bristles is formed from an elastomer and said layer elastically supports the bristles. In this case, the bristles are preferably anchored in the elastomer layer by welding or injection molding.

Advantageously the elastomer layer carrying the bristles is covered by a layer of a less flexible plastic through which the bristles pass. It can be a relatively thin layer, which in conjunction with the bristles welded or injection molded into the elastomer layer additionally increases the extraction resistance.

With such a three-layer structure the bristles can be located in only one or in two adjacent layers, as desired. In addition, one part of the bristles can be fastened in one layer and another part in the two adjacent layers.

The invention is described in greater detail hereinafter relative to embodiments and the attached drawings, wherein show:

BRIEF DESCRIPTION OF THE DRAWING

FIG. 3 A section similar to FIG. 1 through another embodiment.

FIG. 4 A section similar to FIG. 1 through a further embodiment.

FIG. 5a A longitudinal section through a toothbrush head in a three-layer construction.

FIG. 5b A section corresponding to FIG. 5a of a modified construction.

FIG. 6 A side view of a toothbrush head in a modified construction.

FIG. 7 A longitudinal section corresponding to FIG. 1 through a further embodiment.

DESCRIPTION OF THE PREFERRED EMBODIMENT

Figure 1:
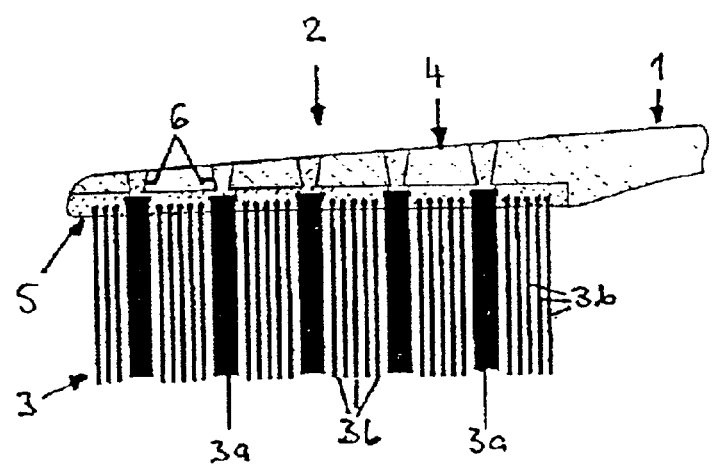
FIG. 1 A longitudinal section through a toothbrush head in a first embodiment.

The toothbrush shown in only detail form in the drawings has a handle 1 and a head serving as the bristle carrier 2 and on which the bristles 3 are located in the form of bundles 3a, areas or in individual standing manner 3b. In the embodiment shown the bristle carrier 2 comprises two substantially parallel layers 4 and 5, whereof the layer 4 is made from a comparatively rigid plastic, whereas the layer 5 is e.g. formed from a rubber-like plastic, particularly an elastomer. The bristles 3 are fastened, e.g. by welding, injection molding or the like in said soft layer 5.

Figure 2:
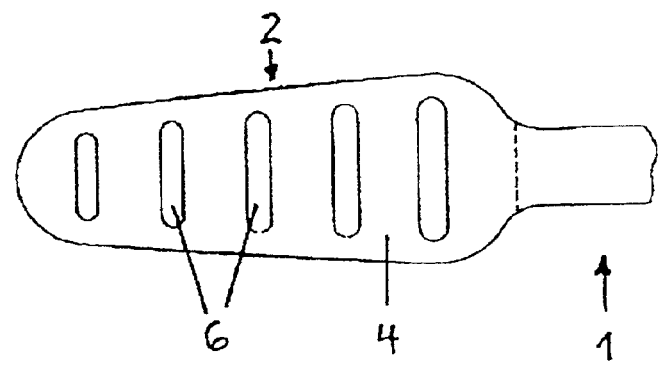
FIG. 2 A plan view of the toothbrush head of FIG. 1.

The layer 4, which is in one piece with the handle 1, and the layer 5 can be produced in a single or in two successive injection moulds using so-called two-component injection molding. In order to enlarge the adhesion surface between the two layers 4 and 5, the bristle carrier 2 has openings 6 which, as shown in FIG. 2, are circumferentially closed and e.g. have a slot-like construction which are penetrated by the plastic of the other layer 5 during injection molding. As shown in FIG. 1, the openings 6 can widen conically outwards, so that the layer 5 is firmly anchored in layer 4.

Through the shaping, number and arrangement of the openings 6 it is possible to adjust the flexibility of the entire brush head of layer 4 and layer 5 to the given needs.

The embodiment according to FIG. 3 differs from that according to FIG. 1 only in that the interface 7 between the two layers 4, 5 is corrugated or studded, but both layers are still substantially parallel to one another. In the area of the top of the wavy interface 7 are located the openings 6 penetrated by the plastic of layer 5 during injection molding. In the area of said top can also be embedded the bristles 3 or bristle bundles in order to ensure a maximum embedding depth. In conjunction with the plastic filling the openings a particularly high extraction resistance is obtained.

The embodiment of FIG. 4 differs from that of FIG. 1 in that the layer 5 receiving the bristles 3 has a wavy or corrugated surface. The bristles 3 combined into bundles 3a are fastened in alignment with the openings in the area of the valleys of the wave profile or local depressions 8, in order to obtain an adequate extraction resistance with comparatively thin layers 4 and 5. Individual bristles 3b are fastened in the vicinity of the wave top or in the thicker areas of the layer 5.

In the embodiment of FIGS. 5a and 5b the bristle carrier 2 is constructed from three layers, namely the layer 4, which is once again in one piece with the handle 1 and can be made from a more rigid plastic, a central layer 10 and a lower layer 11, which can optionally be made from the same plastic as the layer 4, whilst the central layer 10 is e.g. formed by an elastomer. The bristles 3 can either be fastened solely in the lower layer 11, as indicated by the bundle 12, or can extend into the central layer 10, as indicated by the bundles 13. It is finally possible for the bristles 3 to be inserted into the upper layer 4, in the manner of the bristles 14.

In the embodiment according to FIG. 5a the upper layer 4 and lower layer 11 in each case have outwardly widening openings 6 penetrated by the plastic of the central layer 10, whereas in the embodiment according to FIG. 5b the central layer only has openings 15 through which penetrates the plastic of the lower layer 11 into the openings 6 of the upper layer 4. The individual bristles 3b can be anchored in one or more layers so as to fill the openings.

In the embodiment according to FIG. 6 the bristle carrier 2 comprises the layer 4, which is one piece with the handle, but only extends over part of the length of the bristle carrier 2, and the layer 5, which engages below the layer 4 and simultaneously forms the front area 9 of the bristle carrier 2. The layer 4 once again has the openings 6 penetrated by the plastic from the overlapping part of the layer 5. The bristles 3 are exclusively fastened in the layer 5 in the part overlapping the layer 4 and in the part 9 forming the front end.

In the embodiment according to FIG. 7 the bristle carrier 2 once again comprises the layers 4 and 5 and in this case the layer 5 has openings 16 and the plastic of layer 4 penetrates or passes through said openings. In the resulting pin-like projections 17 are inserted the bristles 3 e.g. by punching, injection molding or fastened in some other way. In the embodiment shown the layer 4 is also provided with openings 6 penetrated by the plastic of layer 5.

I claim:

1. A brush comprising:
   a bristle stock;
   a first layer of a first plastic material, said first layer having a plurality of through holes;
   a second layer of a second plastic material differing from said first plastic material, said second layer disposed substantially between said first layer and said bristle stock, said second layer extending substantially parallel to said first layer with said second plastic material filling said through holes, wherein said first and second layers are produced by two component injection molding.

2. The brush of claim 1, wherein a non-positive connection exists between walls of said through holes of said first layer and said second plastic of said second layer filling said through holes.

3. The brush of claim 1, wherein a positive connection exists between walls of said through holes of said first layer and said second plastic of said second layer filling said through holes.

4. The brush of claim 1, wherein an integral connection exists between the walls of said through holes of said first layer and said second plastic of said second layer filling said through holes.

5. The brush of claim 1, wherein said first and said second layers are structured and dimensioned such that the brush flexibly gives way under forces acting on said bristle stock when the brush is in use.

6. The brush of claim 1, wherein at least one of a thicknesses of said first layer, a thickness of said second layer, a choice of said first plastic and a choice of said second plastic are selected and dimensioned to adjust a flexibility of the brush.

7. The brush of claim 1, wherein a number of said through holes in said first layer is selected to adjust a flexibility of the brush.

8. The brush of claim 1, wherein a size of said through holes in said first layer is selected and dimensioned to adjust a flexibility of the brush.

9. The brush of claim 1, wherein a shape of said through holes in said first layer is selected and dimensioned to adjust a flexibility of the brush.

10. The brush of claim 1, wherein said through holes have cylindrical walls.

11. The brush of claim 1, wherein said through holes in said first layer have walls which diverge outwardly from said second layer.

12. The brush of claim 1, wherein said first material has a first color and said second material has a second color differing from said first color, said through holes in said first layer having a contour which, in conjunction with said differently colored first and second plastics of said first and second layers, provides information for a user.

13. The brush of claim 1, wherein at least said second layer is formed from an elastomer to elastically support said bristle stock.

14. The brush of claim 13, further comprising a third layer covering said elastomer layer, said third layer being made from a less flexible plastic through which bristles or said bristle stock pass.

15. The brush of claim 1, further comprising a third layer disposed substantially between said bristle stock and said first layer, wherein bristles of said bristle stock are fastened to at least one of said second layer and said third layer.

16. The brush of claim 1, wherein one of said first and said second layers is shorter in a longitudinal extension of said bristle stock than another one of said first and said second layers, wherein said other one of said first and said second layers supplements said shorter layer over an entire length extension of the bristle stock.

* * * * *